United States Patent Office 2,928,204
Patented Mar. 15, 1960

2,928,204

METHOD AND SYSTEM OF INSECT CONTROL

Morton C. Kahn, New York, N.Y., and William H. Offenhauser, Jr., New Canaan, Conn., assignors to Bionics Ltd., New York, N.Y., a corporation of Delaware No Drawing. Application March 10, 1954
Serial No. 415,434

9 Claims. (Cl. 43—107)

This invention relates generally to improvements in systems and methods for the control of insects, especially insects of the arthropod phylum such as certain species of mosquitoes which are important disease vectors. In a more particular sense, the invention is concerned with an improved insect-attractive sound lure of highly selective character, useful for attracting insects into zones wherein suitable control and/or destruction of the insects can be readily effected.

It is well known that certain species of arthropod insects are of major significance from a public health point of view because they serve as vectors in the transmission of various virulent tropical diseases affecting humans and domesticated animals. This particularly applies to the mosquito species *Aedes aegypti*, *Aedes sollicitans*, *Anopheles gambiae*, *Aedes africanus*, *Aedes argenteus*, *Anopheles maculipennis*, *Aedes flavicollis*, *Aedes niteocephalus*, *Aedes aldopictus*, *Aedes taeniorhyncus*, *Culex fatigans*, *Culex pipiens*, *Taeniorhynchus africanus*, *Anopheles quadrimaculatus* and *Anopheles albimanus*. It is also known that, as a rule, the blood-sucking habits of these insects are confined to the female individuals of the species, which differ from the males in possessing piercing mandibles, thus merely these individuals are to be regarded as the true disease vectors.

An object of the present invention is to provide an improved method and means for control of arthropod insects of the types above mentioned which is particularly effective in the control of those members of the insect community which serve as disease vectors.

It has been recognized that the female insects of the above-mentioned species are capable of emitting sounds within that portion of the audio spectrum which is audible to humans. Many of these sounds are not heard by human beings because they are so weak. It has been observed, also, that certain sounds produced by the insects themselves may be simulated and/or recorded; such sounds are capable of attracting insects in flight, causing them to change their direction of flight to that approaching the sound source. These facts have suggested that a sound source might be used to lure insects into suitable means for controlling or destroying them, but, heretofore, no practicable or commercial means has been devised to effect insect control utilizing a selective sound source as the sole lure for attracting the insects to be controlled.

For example, it has been proposed to use captive insects in a suitable cage as a lure to attract other insects of the same species into insect control means. Obviously this method of luring the insects to be controlled has several disadvantages, including the difficulties of capturing and preserving the live insect lures, the need for frequently replacing the lures as some species live merely a few hours, the fact that the insects intended as lures may choose to emit some sound other than a luring sound and the fact that the sound volume produced by the lures is so slight that the radius of effectiveness of the equipment using lures of this types is inherently extremely limited. It has been proposed, also, to modify equipment of this type by providing means for amplifying the sounds produced by the live lures, thereby increasing materially the effective operating range of control, but this modification, of course, fails wholly to eliminate the above-mentioned disadvantages which are inherent in the use of live insect lures.

In an effort to avoid these disadvantages, it has been suggested to use reproduced recordings of insect-produced sounds as insect lures, but these suggestions have never been given any practical embodiment prior to the present invention. Among the reasons that prior attempts to use recorded insect sounds as insect lures have been unsuccessful are that the sounds produced by insects are of minute amplitude and recording techniques heretofore have been incapable of producing recordings of such sounds having a reproducible component sufficiently above the inherent noise level of the equipment and above the ambient noise level under the recording conditions to be usable as lures. Also, as will be pointed out further hereinafter, not all sounds made by insects, or even all the sounds produced by the female insects, are capable of exercising attraction for other insects.

During field investigations of insect life in tropical and sub-tropical localities where disease-vector types of mosquitoes are chiefly found, the present inventors made extensive studies of the sounds produced by insects of these types. It was found that, by selecting individual female members of these species, recording the sounds individually produced by them over a substantial period of time, and then playing back these sound records in the presence of captive members of the same species, certain types of sounds, daily produced at well-established periods of maximum intensity and capable of being correlated with insect activities normally occurring during these periods, were found to be especially attractive to the captive insects of the selected species. In these investigations, the recorded sounds were electro-acoustically reproduced and directed into an enclosure wherein the captive insects of the same species as that from which the recorded sounds originated, were confined, and the flight patterns and other activities of the confined insects were observed during the playing of the recording. It was found, surprisingly, that the captive insects in flight altered their flight direction to turn toward the sound source merely during brief intervals in the playing of those portions of the recordings represent insect sounds produced daily near sunrise and sunset and that the sounds produced during other periods of the day, indeed, most of the sounds produced even during these periods of maximum insect activity, exercised no attraction for the confined insects.

Continuing these investigations further, the present inventors found that the insect sounds most attractive to insects of the same species are those sounds emitted by the female insects, immediately preceding or while feeding, during the daily periods of maximum insect activity, i.e., during the periods about sunrise and sunset. The present inventors further found, and it is upon the discovery of this surprising principle that the present invention is chiefly based, that if these particular and especially insect-attractive sounds are acoustically modified in a manner hereinafter to be described, a sound pattern is obtained which is outstandingly effective as a lure for the insects of the particular species concerned.

In accordance with the present invention, the sounds produced by a captive female (or female members) of the insect species to be controlled are sensed by an electroacoustical transducer, either immediately before or during feeding, in the time intervals near sunrise and sunset when insect activity is at or approaches its maximum, the electro-acoustical transducer being inherently equalized to be more sensitive to high audio frequency than to low frequency audio sounds, whereby an electrical signal is produced which is correlated in tempo and in the frequency of its wave components with the insect-produced sounds but which, because of the equalization of the transducer, differs in its amplitude/frequency pattern from that of the insect sounds in the sense that the amplitude of the high frequency components is relatively augmented and the amplitude of the low frequency components is diminished, compared with their relative magnitudes in the original, insect-produced, signal. It will be apparent that this electrical signal represents a sound pattern clearly distinguishable from the sound pattern of the original insect sounds and, further, that the intentional acoustical modification of the original insect sound has resulted in a wholly new sound pattern without any known or apparent counterpart in nature.

The electrical signal produced by the electro-acoustical transducer in the manner above-described is passed as the input signal into an electrical signal modifying and amplifying means whereby the signal gross amplitude is magnified and, at the same time, the frequency-amplitude characteristics of the input signal components are modified to introduce an emphasis, in the form of increased magnification, of the high frequency audio components relative to the low frequency audio components of the signal. This modification of the electrical signal during amplification can be accomplished by introducing any of the well-known signal attenuating means, such as filter networks, frequency-discriminative attenuators or the like, into the path of the signal as it passes through the circuitry. The output signal so produced is representative of a sound pattern which is distinctively different, not in gross magnitude merely, but in the frequency-amplitude distribution of its sound components, from the corresponding characteristics of the input signal; thus, it follows that this output signal has no acoustic characteristics in common, other than purely rhythmics, with the insect-produced sounds sensed by the transducer.

The output signal obtained from the electrical signal amplifying and modifying means in the manner above-described is utilized to drive a signal recording means, which may be of any conventional type suitable for producing substantially undistorted reproducible sound records on discs, films, tape or wire. The sound recording thus obtained is utilized to drive an electro-acoustical sound reproducer disposed in the vicinity of a group of captive insects of the species to be controlled and of the same species as the insects producing the sounds sensed by the electro-acoustical transducer. As the recording is played, the behavior of the insect is observed carefully and the recording is indexed to identify those portions which, judging by the behavior of the captive insects, represent sounds most attractive to the insects. These selected portions of the recording are then re-recorded to produce a recording wherein substantially all the sounds recorded are insect-attractive. In accordance with this invention, the recording of this sound train, preferably repetitively recorded upon a continuously playable record, is used as and constitutes the sole insect-attractive sound lure. The term "behavior" as used hereinabove includes flight response, acoustical response and preparation for biting and, in general, involves the insects' response to the stimulus to which they are subjected.

Field experience with this sound lure as the sole means for attracting insects into the sphere of power of insect control means has clearly established this lure to be exceptionally effective for its intended purposes as contrasted with sound lures which merely reproduce the various sounds of the insects, even though magnified in volume. Furthermore, this novel sound lure is truly species selective in the sense that it exerts attraction merely for that species of insect which was used in creating the sounds originally sensed by the electro-acoustical transducer.

To facilitate a better understanding of the present invention, the details of a typical application of its principles in concrete terms will now be described.

When practicing the method according to the present invention for making insect-attractive sound lures, in a presently preferred embodiment, one proceeds substantially as follows: Based upon knowledge of the feeding habits and preferences of the particular species of arthropod insects which it is desired to control, a specimen of live bait, such as a guinea pig, a chicken or a mouse is selected, a suitable skin area is freed of fur or feathers to facilitate attack by the insects, and the bait specimen is anaethetized, using a quick-acting barbiturate or similar orally or parenterally administrable drug rather than those types of anaesthetics, such as chloroform and ether, which are administered by respiratory routes and which might inhibit or alter the feeding practices of the insects attacking the bait.

An acoustically insulated sound chamber is provided, the insulation consisting preferably of alternating layers of sound-reflecting and sound-absorbent materials and sufficient in aggregate thickness to effect a sound transfer loss of at least $-60$ decibels at a frequency of approximately 800 cycles per second. This chamber may be a relatively large enclosure having internal dimensions sufficient to receive the entire bait animal within the enclosure, together with insects and other equipment hereinafter specified, or it may be in the form of a cup-like structure suited to being applied to the prepared area of bait animal skin and to define, with the skin area, an enclosure for receiving equipment and insects, acoustically shielded from ambient noises. In the use of the second-mentioned type of sound chamber, it has been found advantageous to provide a pneumatic seal at the edges of the sound chamber resting against the skin of the bait animal and, by partially evacuating gas from the interior of the chamber, to cause the chamber to be retained in the desired position on the bait animal's skin.

When the sound chamber has been made ready, either by depositing the anaesthetized bait animal therein or by attaching the cup-like chamber to the animal's skin, and a suitable sound transducer of a type hereinafter specified in detail has been placed with its sound-sensing means in position to sense sounds within the chamber, live female individuals of the arthropod insect species to be controlled are admitted into the interior of the chamber at a time of day when the species is active, preferably most active, and permitted to attack the bait animal. The sounds produced by the insects in anticipation of a blood meal and/or as they feed upon the bait animal affect the sound transducer, which differs from ordinary sound transducers in that it is materially more sensitive to high audio sound frequencies than to low audio sound frequencies, and the sound transducer translates the insect sounds into a modulated electric signal which is utilized in signal-modifying and signal-amplifying equipment for driving signal-recording means as hereinafter described.

The signal-modifying and signal-amplifying means utilized in the practice of this invention preferably is a single unit consisting of a high-gain (approximately 160 decibels over-all gain) amplifier capable of producing an output signal at a level of at least 40 decibels above the noise level and having, as an integral part of its circuitry, means for modifying, by frequency discriminative elements, the over-all response characteristics of the amplifier, so that the audio frequency/amplification curve is not flat but, instead, rises with increase of audio frequency at the rate of approximately 6 decibels per octave, which amplifier includes a conventional volume limiter with its standard off/on switch. It will be understood that the use of an amplifier so characterized produces an output signal which is not a mere magnified image of the signal fed to the amplifier input but that, instead, the output signal is a new and different signal having high audio and low audio frequency components in differing relative degrees of amplitude than occurred in the original input signal.

The transducer within the sound chamber, as before mentioned, is electrically coupled to the signal modifying and amplifying means above described, whereby an output signal is produced which, as regards rhythmics and continuity, accurately reflects the insect sounds upon a magnified scale, but which, because of the frequency-discriminative characteristics of the transducer and the signal-modifying and signal-amplifying means, materially departs in wave pattern from the wave pattern characteristic of the original insect sounds. This sound signal, for convenience, is referred to hereinafter as the first derived sound signal.

This first derived sound signal, when subjected to wave analysis, is revealed to be a composite sound pattern of extreme complexity. It is found to be comprised of a well-defined fundamental lying near the middle of the human audio range, with accompanying harmonics in varying degrees of emphasis, the whole signal or, in some instances, merely the harmonics, being subject to a low frequency warble of about 5 to 10 percent at a frequency of about 2 to 15 cycles per second with a second warble of about one-fifth to one-tenth the magnitude of the first warble at a frequency about five times the first warble frequency. Additionally, the signal is subject to intermittent discontinuities and rhythmic effects corresponding to similar effects in the original sounds produced by the captive insects and sensed by the transducer.

The output signal of the aforementioned signal modifying and amplifying means is utilized to drive a suitable recording means to produce a reproducible recording of the signal. To be suitable for this purpose, the recording equipment must be of a quality such that the full spectrum of audio components of the signal is faithfully recorded without substantial distortion, particularly as regards the relative magnitudes of these components in the composite signal.

The recording so obtained is utilized to drive a sound reproducer which, like the recording means, is so selected that the sound components of the recorded signal are faithfully reproduced without any substantial distortion. A suitable enclosure is provided for receiving and retaining, in captive state, a group of the insects of the species to be controlled, but permitting the insects sufficient freedom of movement so that they may fly about within the enclosure while their movements and conduct are observed by a technician outside the enclosure. The sound reproducer above-mentioned is disposed within or adjacent to the enclosure and the recording is played back through the reproducer while the technician observes the behavior of the captive insects in the enclosure, noting particularly when the insects flying within the enclosure modify their direction of flight to turn toward the reproducer, thereby indicating that an insect-attractive sound is being reproduced from the then-playing portion of the recording. Its output is so adjusted that the sound level presented to the captive insects is similar in order to that which they themselves produce. It is to be understood that such an adjustment is convenient and highly desirable but that other levels, higher or lower, may be used. We have discovered that when a response-evoking first-derived stimulus signal obtained from a female insect, seemingly broadcasting her finding of a blood meal, is so presented, three substantially simultaneous responses usually occur: (1) she directs her flight toward the sound source, (2) she emits sounds, and (3) she acts to relay the food call she has just "heard" to other female insects in her vicinity. The flight toward the sound source may be observed by eye by the technician, by photography or by electronic means, as, for example, by so adjusting the electronic means that the presence of an insect alters the circuit capacitance or other parameter, and so forth. The response-evoking first-derived stimulus signal may be as short as a fraction of a second in duration; it may be necessary to repeat it so that it is, in effect, played over a continuing interval with appropriate periods of silence between repeats to permit the captive insects to respond to the recorded stimulus signal. These portions of the recording thus empirically selected are marked to facilitate later reference to them and, after the playing of the entire recording has been completed, the selected portions of the recording are separately recorded as the second derived sound signal. Since we have discovered that the captive female insects respond by means of sound to such sounds which, to a female insect, are like the sounds of another female insect broadcasting the finding of food, i.e., a blood meal, and its location, answering, so to speak, with sound and relaying the information of the finding of the blood meal and its location to other female insects nearby, we have found that the re-recording is especially effective when it contains not only the response-evoking first-derived stimulus signal previously referred to but also contains the sound responses of the captive female individuals to whom the test signal was presented. Such a re-recording, when used as a lure, appears to be even more effective than the response-evoking first-derived stimulus signal alone since it not only presents information about the finding of a blood meal and the apparent location thereof, but presents also acknowledgment of the receipt of that information and the relaying of the information to still other female insects. While this composite re-recording is new and very effective, we do not intend to limit our claims to this form of re-recording alone, but to claim the component sounds individually and in all combinations. The response-evoking first-derived stimulus signal used is a sex-selected call from a female of the selected species which is effective upon individuals of the same sex of that species; in re-recording, it is desirable but not necessary to have a small and directional loudspeaker and to provide a reasonably clear sound path between the loudspeaker and the captive female insects so that the sound from the loudspeaker is not seriously dispersed and/or excessively absorbed by acoustical barriers located between said loudspeaker and the captive insects under test. The re-recording may be accomplished by either acoustical or electrical means; we have preferred acoustical means as the structures involved are simpler and it permits the ears of our technicians to become accustomed to the stimulus sounds as heard by the test insects, and to become familiar with all their variations due to species, due to test stimuli, etc. In practice, the loudspeaker used to present the test stimulus to the captive insects under test may be located either outside of or within the insect-containing enclosure as may prove more convenient in practice. The insect-containing enclosure may also contain the microphone, or not, as may prove more convenient in practice. The insect-containing enclosure may or may not act as a sound-insulating acoustical enclosure as may prove more convenient in practice. The teachings described herein have been embodied in successful tests. In these tests, few, if any, male individuals of the *Aedes taeniorhynchus* or of the *Aedes sollicitans* species were killed by the six electrocuting screens used; periodic samplings of the insects killed showed them to be almost entirely females. This finding was in accord with our earlier observations which indicated that sex sounds of male individuals are ineffective as lures for female individuals of mosquitoes. It was also noted that in some cases the sounds of response to a stimulus call and the relaying of such a call may be the same, or that one may very frequently accompany the other. It will be understood that this re-recording is effected utilizing equipment which will provide a faithful reproducible recording of the selected excerpts of the first derived sound recording without introducing any appreciable audio distortion. This recording of the second derived sound signal provides, when reproduced as sound, the novel insect-attractive sound lure according to this invention. It is preferred, although it is not essential to the practical utilization of the principles of this invention, that the second derived sound signal be re-recorded repetitively to constitute a continuously reproducible sound record, thereby facilitating its use for attracting insects into the power of suitable insect control means, either repelling or destructive, preferably lethal.

The insect control means utilized in conjunction with the insect-attractive sound lure of this invention may comprise electrically charged foraminous sheets or grids that may be disposed near the sound source through which the second derived sound signal is reproduced, whereby insects attracted to the sound source are electrocuted or burned, or any other conveniently available means for destroying the attracted insects may be used in conjunction with the lure in a similar manner.

It is to be particularly emphasized that, in order to obtain a practicable, commercially feasible and wholly satisfactory recording capable of serving as a sole, effective lure, the two following conditions must be strictly observed in making the recording in accordance with the procedure described: (1) Substantially all the sound energy radiated by the insect in question must be collected and (2) substantially all surrounding ambient or extraneous noise must be excluded. It has been found that less stringent conditions do not make possible our new and important results.

This application is a continuation-in-part of our copending applications, Ser. No. 145,496, filed February 21, 1950, entitled "Insect Control Apparatus and Methods," and Ser. No. 300,845, filed July 25, 1952, entitled "Insect Control Apparatus and Methods," now abandoned.

We claim:

1. A method for making a recording of a derived sound signal attractive to selected species of arthropod insects which comprises isolating, in a chamber acoustically insulated from ambient sounds, at least one live female member of the selected insect species, together with an insect food source and an electro-acoustical transducer more sensitive to high frequency than to low frequency audio signals; obtaining signals from the transducer produced by sounds made by the insects while feeding during the periods around sunrise and sunset when insect activity is greatest and modifying the signals so obtained by amplifying them utilizing a frequency-discriminative amplifier which emphasizes high audio frequency relative to low audio frequency signals, whereby an output signal is derived from the amplifier representative of a first derived sound; recording said first derived sound and reproducing the sound from said recording in the presence of captive live members of the insect species to be controlled, marking portions of the recording representing sounds most attractive to the captive insects based upon the behavior of the insects; and re-recording the thus marked portions of the recording repetitively as a record of a second derived sound signal which is characterized by being a highly attractive and selective sole lure for insects of the selected species.

2. A method for making a recording of a derived sound signal attractive to a member of a species of arthropod insects selected the group consisting of Aedes aegypti, Aedes sollicitans, Anopheles gambiae, Aedes africanus, Aedes argenteus, Anopheles maculipennis, Aedes flavicollis, Aedes niteocephalus, Aedes aldopictus, Aedes taeniorhyncus, Culex fatigans, Culex pipiens, Taeniorhynchus africanus, Anopheles cuadrimaculatus and Anopheles albimanus, which comprise isolating in a chamber acoustically insulated from ambient sounds, at least one live female member of the selected insect species, together with an insect food source and an electro-acoustical transducer more sensitive to high frequency than to low frequency audio signals; obtaining signals from the transducer produced by sounds made by the insects while feeding during the periods around sunrise and sunset when insect activity is greatest and modifying the signals so obtained by amplifying them utilizing a frequency-discriminative amplifier which emphasizes high audio frequency relative to low audio frequency signals, whereby an output signal is derived from the amplifier representative of a first derived sound; recording said first derived sound; reproducing the sound from said recording in the presence of captive live members of the insect species to be controlled; marking portions of the recording representing sounds most attractive to the captive insects based upon the behavior of the insects; and re-recording the thus marked portions of the recording repetitively as a record of a second derived sound signal which is characterized by being a highly attractive sole lure for insects of the selected species.

3. In a system for the control of arthropod insects utilizing an insect-audible sound source as the sole lure for attracting insects to be controlled, an improved sound lure which comprises a recording of a derived sound signal obtained by isolating, in a chamber acoustically insulated from ambient sounds, at least one live female member of the selected insect species, together with an insect food source and an electroacoustical transducer more sensitive to high frequency than to low frequency audio signals; obtaining signals from the transducer produced by sounds made by the insects while feeding during the periods around sunrise and sunset when insect activity is greatest, modifying the signals so obtained by amplifying them utilizing a frequency-discriminative amplifier which emphasizes high audio frequency relative to low audio frequency signals, whereby an output signal is derived from the amplifier, recording said output signal and reproducing the sound it represents in the presence of captive live members of the insect species to be controlled, marking portions of the recording representing sounds most attractive to the captive insects based upon the behavior of the captive insects, and re-recording the thus marked portions of the recording repetitively as a record of a derived sound signal characterized by being a highly attractive lure for insects of the selected species.

4. A sound lure in accordance with claim 3, in which the lure sounds are of low level and are relayed by the insects themselves.

5. A sound lure in accordance with claim 3, in which information is recorded which sounds to a female insect like another female insect, thereby serving to broadcast the locating as well as the location of a blood meal.

6. A sound lure in accordance with claim 3, in which the re-recording is short.

7. A sound lure in accordance with claim 3, in which the re-recording is played over a continuing interval.

8. A sound lure in accordance with claim 3, in which information is recorded which sounds to a female insect like another female insect, thereby serving to broadcast the location as well as the locating of a blood meal, and is played and replayed to cover a continuing interval.

9. A sound lure in accordance with claim 3, in which the lure is a sex-selected call to which individuals of the same sex are responsive.

References Cited in the file of this patent

UNITED STATES PATENTS

| | | |
|---|---|---|
| 1,700,450 | Reynolds | Jan. 29, 1929 |
| 1,870,778 | Lang | Aug. 9, 1932 |

FOREIGN PATENTS

| | | |
|---|---|---|
| 430,604 | Great Britain | June 21, 1935 |

(Other references on following page)

OTHER REFERENCES

Washington Post, page 34, Aug. 15, 1952.

"The Songs of Insects," by G. W. Pierce, page 57, published 1948 by Harvard University Press, Cambridge, Mass.

"First Field Tests of Recorded Mosquito Sounds Used for Mosquito Destruction," by Morton C. Kahn and William Offenhauser, Jr., American Journal of Tropical Medicine, vol. 29, September 1949 issue, pages 811 through 825. The copyright date of this publication is October 14, 1949.

Popular Science, July 1945, page 75.

Great Britain, application No. 3,018. Convention date claimed, December 24, 1943. Complete specification open to inspection June 24, 1945.